No. 850,064. PATENTED APR. 9, 1907.
H. SHOEMAKER.
APPARATUS FOR MEASURING ELECTRIC CAPACITY.
APPLICATION FILED OCT. 9, 1906.
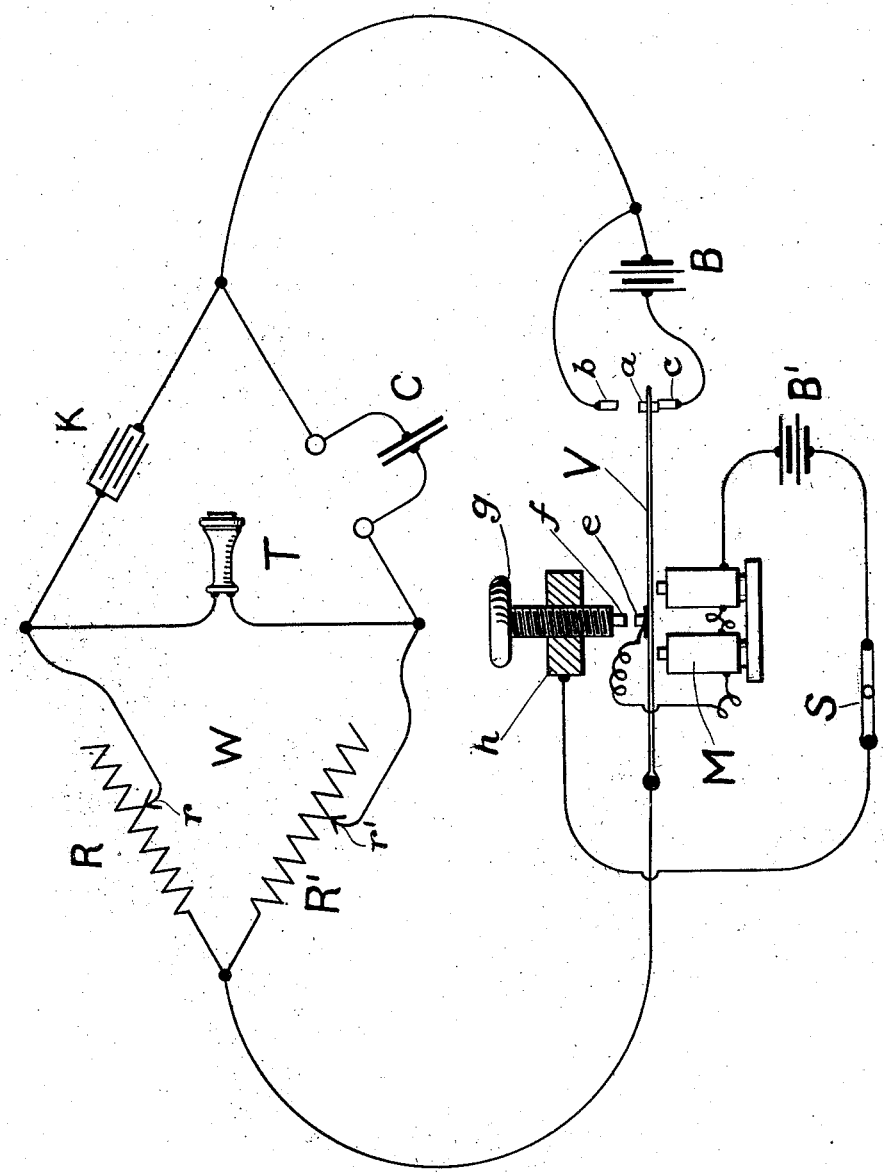
WITNESSES:
Anna E. Steinbock
Alice S. Marsh
INVENTOR
Harry Shoemaker
BY
Cornelius D. Ehret
HIS ATTORNEY

UNITED STATES PATENT OFFICE.

HARRY SHOEMAKER, OF JERSEY CITY, NEW JERSEY.

APPARATUS FOR MEASURING ELECTRIC CAPACITY.

No. 850,064.  Specification of Letters Patent.  Patented April 9, 1907.

Application filed October 9, 1906. Serial No. 338,100.

*To all whom it may concern:*

Be it known that I, HARRY SHOEMAKER, a citizen of the United States, residing at Jersey City, in the county of Hudson and State of New Jersey, have invented a new and useful Apparatus for Measuring Electric Capacity, of which the following is a specification.

My invention relates to the measurement or determination of the electric capacity of a condenser or a condenser-like device.

It is the object of my invention to provide apparatus which will allow such measurements or determinations to be accomplished promptly and with greatest accuracy and facility.

For an illustration of a form my invention may take reference is to be had to the accompanying drawing, which is a diagrammatic view showing the various elements and their circuit connections.

W represents a Wheatstone bridge arrangement. The known resistance R, preferably non-inductive, is connected in one arm of the bridge along with the condenser K, whose capacity is variable and known. To the other arm of the bridge are connected the variable resistance R', preferably non-inductive, and the condenser or like device C whose electrostatic capacity is to be determined. A magneto or other telephone receiver T is connected in the bridge. The common terminal of the resistances R and R' is connected with the reed or vibrator V, which carries at or near its extremity a contact-piece $a$, adapted to alternately engage the stationary contacts $b$ and $c$. A battery or other source of current B is connected between the common terminal of the condensers K and C and the contact $c$, and the contact $b$ is connected directly to the common terminal of the condensers K and C. An electromagnet M has its winding included serially in circuit with a battery B', the switch S, the contact $f$ on the adjustable screw $g$ passing through a frame or member $h$. The contact $e$ is preferably insulated from the vibrator V. When the switch S is closed, the vibrator or reed V is set in motion by the electromagnet M, and when attracted the magnet-circuit is broken, and the vibrator V then springs back against contact $f$, again closing the magnet-circuit. This operation is repeated at a relatively rapid rate so long as the switch S is closed.

With the parts in position shown, the battery B has charged the condensers K and C through the resistances R and R', respectively. The contact $a$ is carried against contact $b$, however, by the return of the vibrator V, with resultant discharge of the condensers K and C' through the respective resistances R and R'. The riders $r$ and $r'$ (or the plugs) if resistance-boxes are used are suitably adjusted, as is also the variable condenser K. Adjustments are made of the resistances and of the condenser K until no noise or tone is heard in the telephone T. When this condition is obtained, an electrical balance has been struck, and by noting the capacity of K, which is always known, and the values of the resistances R and R', which are in circuit, the capacity of C is immediately determined.

Since the telephone is an extremely sensitive instrument and is responsive to the slightest current, a condition of delicate balance is assured when no sound occurs in the telephone.

By the apparatus above described measurements or determinations are quickly and most accurately made. The rate of charge and discharge of the condensers K and C may be varied by changing the period of the vibrator V, which may be done either by changing the adjustment of the screw $g$ or by changing the natural period of the vibrator V in well-known ways.

The above-described apparatus may take the form of a measuring instrument by inclosing the resistances R R', the variable condenser K, the batteries B B', and the vibrator apparatus in a suitable box or receptacle, the various contacts and adjustable parts being arranged on hard-rubber slabs secured within the box.

What I claim is—

1. In combination, a Wheatstone bridge, a known capacity connected in one arm thereof, an unknown capacity connected in the other arm thereof, and means for automatically charging and discharging said capacities.

2. In combination, a Wheatstone bridge, a known capacity and resistance connected in one arm thereof, a known resistance and an unknown capacity connected in another arm thereof, means for automatically charging and discharging said capacities, and an instrument for indicating when said bridge has been balanced.

3. In combination, a Wheatstone bridge, a known capacity connected in one arm thereof, an unknown capacity connected in another arm thereof, a vibrator and a source of energy, said bridge as a whole connected in series with said vibrator and source of energy, and means for discharging said capacities after each charge controlled by said vibrator.

4. In combination, a Wheatstone bridge, an automatic vibrator and source of energy serially connected with each other and with said bridge as a whole, a known capacity connected in one arm of the bridge, an unknown capacity connected in another arm of the bridge, and an instrument for indicating when the bridge has been balanced.

5. In combination, a Wheatstone bridge, a known capacity connected in one arm thereof, an unknown capacity connected in another arm thereof, and means for alternately and rapidly charging and discharging said bridge 6 The combination with a Wheatstone bridge, a device to be tested included in an arm of said bridge, of an external source of energy, an indicating instrument and automatic means for rapidly and alternately charging and discharging said bridge.

7. In combination, known and unknown capacities and resistances, means for automatically charging and discharging said capacities, and an indicating instrument.

8. In combination, a Wheatstone bridge, resistances and known and unknown capacities in the arms thereof, an indicating instrument, a circuit including said bridge as a whole and a source of energy, and automatic means for alternately closing said circuit through said source of energy and a short circuit.

9. In combination, a Wheatstone bridge, known and unknown capacities connected in the arms thereof, an indicating instrument, a circuit including said bridge as a whole and a source of energy, and a vibrator for alternately closing said circuit through said source of energy and short-circuiting said bridge as a whole.

10. In combination, branched circuits containing respectively known and unknown capacities, an indicating instrument, a circuit containing a source of energy and said branched circuits, and means for alternately connecting said branched circuits through said source of energy and short-circuiting said branched circuits.

11. In combination, branched circuits, an indicating instrument, electrical devices of similar characteristics connected respectively in said branched circuits, one of said devices having a known quantity of electrical action, the other an unknown quantity of electrical action, a circuit including said branched circuits and a source of energy, and means for alternately closing the circuit through said source of energy and through a short-circuit.

12. In combination, a Wheatstone bridge, known and unknown capacities connected in the arms thereof, an indicating instrument, a circuit including a source of energy and said bridge as a whole, and an automatic vibrator alternately closing said circuit through said source of energy and short-circuiting said bridge as a whole.

In witness whereof I have hereunto affixed my signature in the presence of the two subscribing witnesses.

HARRY SHOEMAKER.

Witnesses:
JOHN FIRTH,
G. M. BUCHANAN.